United States Patent
Haviv et al.

(10) Patent No.: US 8,201,168 B2
(45) Date of Patent: Jun. 12, 2012

(54) VIRTUAL INPUT-OUTPUT CONNECTIONS FOR MACHINE VIRTUALIZATION

(75) Inventors: Yaron Haviv, Tel Mond (IL); Albert Berlovitch, Ramat Gan (IL)

(73) Assignee: Voltaire Ltd., Ra'Anana (IL)

(*) Notice: Subject to any disclaimer, the term of this patent is extended or adjusted under 35 U.S.C. 154(b) by 835 days.

(21) Appl. No.: 12/344,235

(22) Filed: Dec. 25, 2008

(65) Prior Publication Data

US 2010/0169880 A1   Jul. 1, 2010

(51) Int. Cl.
G06F 9/455 (2006.01)
(52) U.S. Cl. ............................. 718/1; 709/224
(58) Field of Classification Search ....... 718/1; 709/224
See application file for complete search history.

(56) References Cited

U.S. PATENT DOCUMENTS

| | | | |
|---|---|---|---|
| 5,991,299 A | 11/1999 | Radogna et al. | |
| 6,061,349 A | 5/2000 | Coile et al. | |
| 6,366,558 B1 | 4/2002 | Howes et al. | |
| 6,421,711 B1 | 7/2002 | Blumenau et al. | |
| 6,445,704 B1 | 9/2002 | Howes et al. | |
| 6,587,469 B1 | 7/2003 | Bragg | |
| 6,789,054 B1 | 9/2004 | Makhlouf | |
| 6,789,118 B1 | 9/2004 | Rao | |
| 6,967,949 B2* | 11/2005 | Davis et al. | 370/390 |
| 7,016,060 B1 | 3/2006 | Carney et al. | |
| 7,181,302 B2 | 2/2007 | Bayne | |
| 2002/0021701 A1 | 2/2002 | Lavian et al. | |
| 2004/0076161 A1* | 4/2004 | Lavian et al. | 370/395.41 |
| 2004/0210623 A1* | 10/2004 | Hydrie et al. | 709/201 |
| 2004/0252722 A1 | 12/2004 | Wybenga et al. | |
| 2005/0120160 A1 | 6/2005 | Plouffe et al. | |
| 2005/0267967 A1* | 12/2005 | Markos et al. | 709/224 |
| 2006/0074618 A1* | 4/2006 | Miller et al. | 703/13 |
| 2006/0156059 A1 | 7/2006 | Kitamura | |
| 2006/0165040 A1 | 7/2006 | Rathod et al. | |
| 2006/0221961 A1 | 10/2006 | Basso et al. | |
| 2006/0242288 A1 | 10/2006 | Masurkar | |
| 2007/0133552 A1* | 6/2007 | Kubo et al. | 370/395.2 |
| 2007/0140266 A1 | 6/2007 | Njoku et al. | |
| 2008/0123559 A1 | 5/2008 | Haviv et al. | |

OTHER PUBLICATIONS

U.S. Appl. No. 11/635,119 Official Action dated Dec. 7, 2009.
Cisco Systems Inc., "Introduction to Cisco VN-Link Network Services", Sep. 2008.
Cisco Systems Inc., "Cisco VN-Link Virtual Machine Aware Network and Storage Services", year 2008.
Lassere et al., "Virtual Private LAN Service (VPLS) Using Label Distribution Protocol (LDP) Signaling", Network Working Group, RFC4762, Jan. 2007.
U.S. Appl. No. 11/635,119 Official Action dated Sep. 23, 2008.

(Continued)

*Primary Examiner* — Keith Vicary

(74) *Attorney, Agent, or Firm* — D. Kligler I.P. Services Ltd.

(57) ABSTRACT

A computing method includes specifying a virtual computer system including at least one virtual or physical compute node, which produces data packets having respective source attributes. At least one Virtual Input-Output Connection (VIOC) that is uniquely associated with the values of the source attributes is defined. A policy specifying an operation to be performed with regard to the VIOC is defined. The virtual computer system is implemented on a physical computer system, which includes at least one physical packet switching element. The physical packet switching element is configured to identify the data packets whose source attributes have the values that are associated with the VIOC and to perform the operation on the identified data packets, so as to enforce the policy on the VIOC.

31 Claims, 3 Drawing Sheets

OTHER PUBLICATIONS

U.S. Appl. No. 11/635,119 Official Action dated Jun. 10, 2009.
Ishihara et al., "Carrier-Grade Ethernet Switch for Reliable Wide-Area Ethernet Service", Fujitsu Science Technology Journal, vol. 39, No. 2, pp. 234-243, Dec. 2003.
Pelissier et al., "Thoughts on Network Interface Virtualization", Sep. 2008.
Ganga et al., "Virtual Ethernet Bridging in Server End Stations", IEEE 802.1 Interim Meeting, Seoul, Korea, Sep. 16, 2008.
Ghanwani et al., "Bridge Requirements for Server Virtualization", Sep. 2008.
Ko et al., "Virtual Ethernet Bridging", IBM, Jul. 16, 2008.
International Application PCT/IL2007/000867 Search Report dated Sep. 23, 2008.
Nortel, Application Brief: Dynamic Resource Allocation Controller (DRAC), Nortel Networks, 2006.
Travostino et al., "Project DRAC: Creating an Applications-Aware Network", Supercomputing 2004, Pittsburgh, USA, Nov. 6-12, 2004.
Hewlerd Packard Inc., "New HP OpenView Software Enables CIOs to Run IT as a Business", HP News Release, Miami, USA, Jun. 20, 2006 (http://www.hp.com/hpinfo/newsroom/press/2006/060620a.html).
Cisco Systems Inc., "Cisco VFrame—Frequently Asked Questions", 1992-2006.
"Enterprise Grid Computing: Overview", Enterprise Grid Alliance, Jan. 2006.
DMTF, CIM Device Model White Paper, CIM Version 2.7, version 0.9, Jun. 19, 2003.
DMTF, CIM System Model White Paper, CIM Version 2.7, Document version 1.0, Jun. 10, 2003.
IBM Software, Tivoli Solutions: Orchestration and Provisioning Management, Mar. 13, 2006 http://web.archive.org/web/20061017093540/www-306.ibm.com/software/tivoli/solutions/orchestration-provisioning-management/.

* cited by examiner

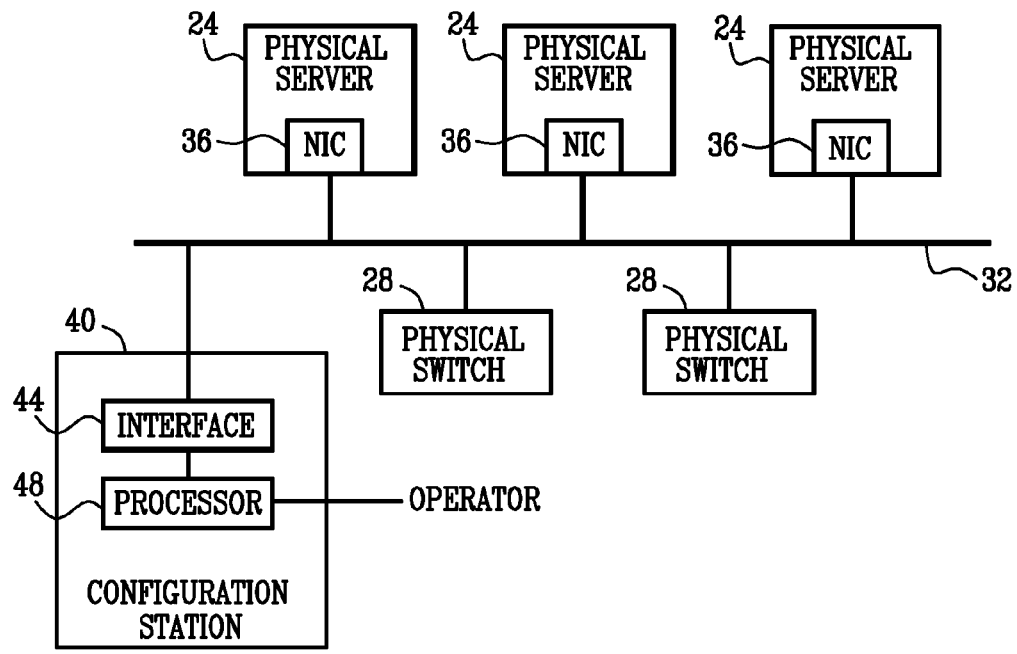
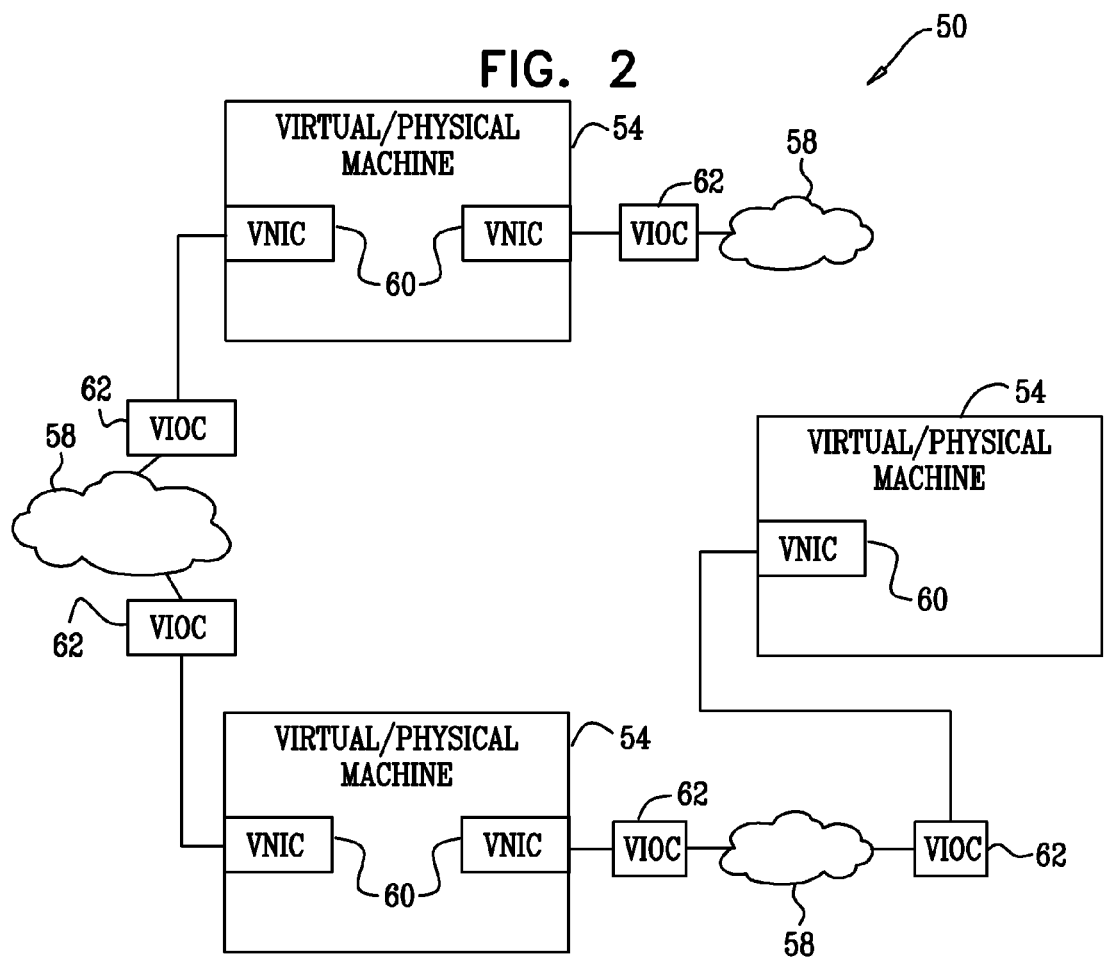

VIRTUAL INPUT-OUTPUT CONNECTIONS FOR MACHINE VIRTUALIZATION

FIELD OF THE INVENTION

The present invention relates generally to machine virtualization, and particularly to methods and systems for operating virtual input-output connections of virtual and physical machines.

BACKGROUND OF THE INVENTION

Various Information technology (IT) domains apply machine virtualization techniques. Example virtualization systems are provided, for example, by VMware, Inc. (Palo Alto, Calif.). Cisco Systems, Inc. (San Jose, Calif.), provides server virtualization networking technology called VN-Link. The VN-Link technology is described, for example, in a Cisco Solution Overview entitled "Introduction to Cisco VN-Link Network Services," September, 2008, which is incorporated herein by reference.

SUMMARY OF THE INVENTION

An embodiment of the present invention provides a computing method, including:

specifying a virtual computer system including at least one virtual or physical compute node, which produces data packets having respective source attributes;

defining at least one Virtual Input-Output Connection (VIOC) that is uniquely associated with the values of the source attributes;

defining a policy specifying an operation to be performed with regard to the VIOC;

implementing the virtual computer system on a physical computer system that includes at least one physical packet switching element; and configuring the physical packet switching element to identify the data packets whose source attributes have the values that are associated with the VIOC and to perform the operation on the identified data packets, so as to enforce the policy on the VIOC.

In some embodiments, specifying the virtual computing system includes specifying a Virtual Network Interface Card (VNIC) for the compute node, and defining the VIOC includes associating the VIOC with the VNIC. In an embodiment, the source attributes include at least one attribute type selected from a group of types consisting of a source Media Access Control (MAC) address, a source Virtual Local Area Network (VLAN), a priority level and a source Internet Protocol (IP) address. In a disclosed embodiment, configuring the physical packet switching element includes producing a definition, having a format that is recognizable by the physical packet switching element, of the values of the source attributes that are associated with the VIOC, and configuring the physical packet switching element using the definition. In an embodiment, the definition includes an Access Control List (ACL).

In another embodiment, configuring the physical packet switching element includes detecting a change in one of the physical computer system and the virtual computer system, and re-configuring the physical packet switching element responsively to the detected change, so as to cause the physical packet switching element to continue enforcing the policy. In an embodiment, the at least one physical packet switching element includes first and second physical packet switching elements, configuring the physical packet switching element includes initially configuring the first physical packet switching element to enforce the policy, and re-configuring the physical packet switching element includes, responsively to detecting the change, configuring the second physical packet switching element to enforce the policy. In yet another embodiment, the physical computer system includes at least one physical computer including multiple physical ports, and defining the VIOC includes aggregating the multiple physical ports and associating the VIOC with the multiple aggregated physical ports.

In some embodiments, the policy specifies access privileges with regard to the data packets that are associated with the VIOC, a Virtual Local Area Network (VLAN) for exchanging the data packets that are associated with the VIOC, an encryption operation to be applied with regard to the VIOC, an authentication operation to be applied with regard to the VIOC, a Quality-of-Service (QoS) property of the VIOC and/or a mirroring operation to be performed with regard to the VIOC. In an embodiment, the policy requests monitoring of information related to the VIOC. In another embodiment, the policy requests one of an activation and a deactivation of the VIOC.

In a disclosed embodiment, defining the at least one VIOC includes defining multiple VIOCs and grouping the multiple VIOCs to form a VIOC cluster, defining the policy includes defining a cluster policy to be applied to the multiple VIOCs in the VIOC cluster, and configuring the physical packet switching element includes configuring the physical packet switching element to apply the cluster policy to the data packets that are associated with any of the VIOCs in the VIOC cluster.

There is additionally provided, in accordance with an embodiment of the present invention, a computing apparatus, including:

an interface, which is operative to communicate with a physical computer system that includes at least one physical packet switching element; and a processor, which is coupled to accept a specification of a virtual computer system including at least one virtual or physical compute node, which produces data packets having respective source attributes, to accept a definition of at least one Virtual Input-Output Connection (VIOC) that is uniquely associated with the values of the source attributes, to accept a policy specifying an operation to be performed with regard to the VIOC, to implement the virtual computer system on the physical computer system, and to configure the physical packet switching element to identify the data packets whose source attributes have the values that are associated with the VIOC and to perform the operation on the identified data packets, so as to enforce the policy on the VIOC.

There is further provided, in accordance with an embodiment of the present invention, a computer software product, including a computer-readable medium in which program instructions are stored, which instructions, when read by a processor, cause the processor to communicate with a physical computer system that includes at least one physical packet switching element, to accept a specification of a virtual computer system including at least one virtual or physical compute node, which produces data packets having respective source attributes, to accept a definition of at least one Virtual Input-Output Connection (VIOC) that is uniquely associated with the values of the source attributes, to accept a policy specifying an operation to be performed with regard to the VIOC, to implement the virtual computer system on the physical computer system, and to configure the physical packet switching element to identify the data packets whose source attributes have the values that are associated with the VIOC and to perform the operation on the identified data packets, so as to enforce the policy on the VIOC.

The present invention will be more fully understood from the following detailed description of the embodiments thereof, taken together with the drawings in which:

BRIEF DESCRIPTION OF THE DRAWINGS

FIG. 1 is a block diagram that schematically illustrates a physical computer system, in accordance with an embodiment of the present invention;

FIG. 2 is a block diagram that schematically illustrates a virtual computer system, in accordance with an embodiment of the present invention;

DETAILED DESCRIPTION OF EMBODIMENTS

Overview

Figure 3:
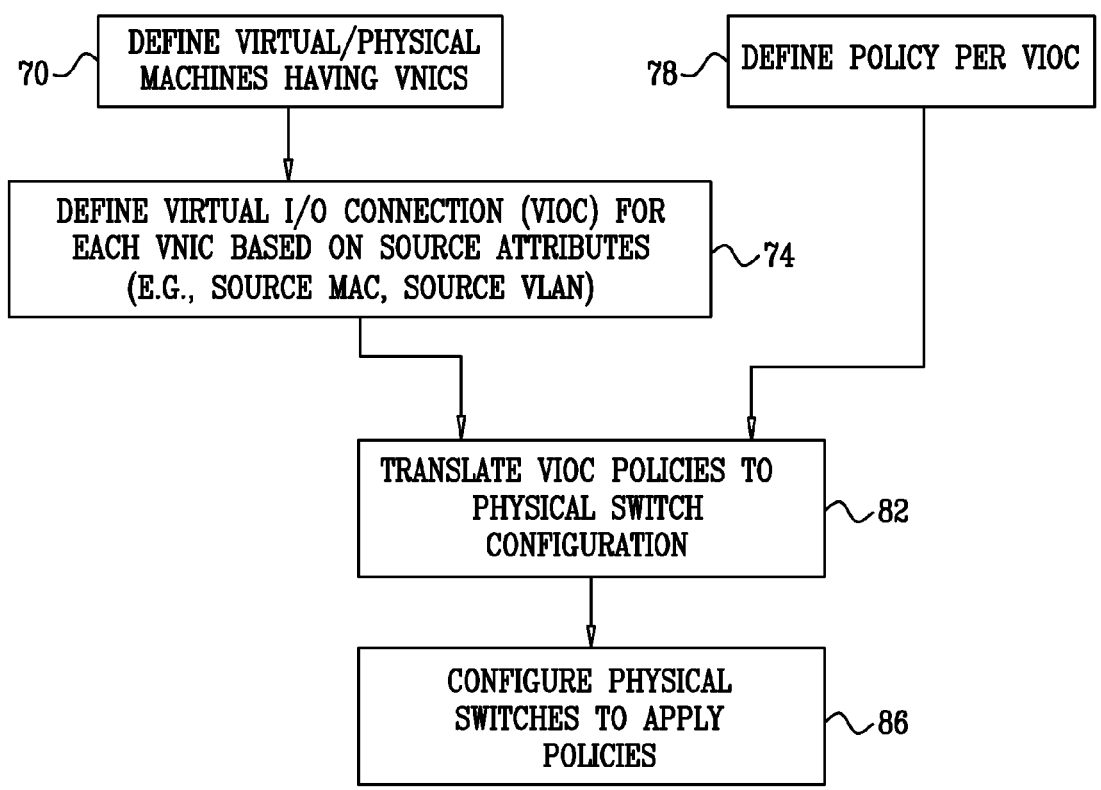
FIG. 3 is a flow chart that schematically illustrates a method for specifying and operating a virtual computer system, in accordance with an embodiment of the present invention.

Embodiments of the present invention that are described hereinbelow provide methods and systems for defining and operating Virtual Input-Output Connections (VIOCs) of virtual and physical compute nodes. In some embodiments, a virtual computer system is defined and implemented using the resources of a physical computer system. The virtual computer system comprises one or more virtual or physical compute nodes, and possibly other virtual components such as virtual networks and virtual storage devices. Each virtual or physical compute node comprises one or more Virtual Network Interface Cards (VNICs), and communicates by exchanging data packets via the VNICs. Typically but not necessarily, the VNICs emulate the functionality of Ethernet™ Network Interface Cards (NICs) or of Infiniband Host Channel Adapters (HCAs). Typically, each VNIC can be identified by certain source attributes of the data packets it generates. Source attributes may comprise, for example, source Media Access Control (MAC) address, source Virtual Local Area Network (VLAN) and/or source Internet Protocol (IP) address values.

The physical computer system, which serves as a physical infrastructure for implementing the virtual computer system, comprises at least one physical packet switch. The operation of the physical system, and of the virtual system implemented therein, are configured and controlled by an operator using a configuration station. In particular, the operator defines a Virtual Input/Output Connection (VIOC) for each VNIC of the virtual system. A given VIOC represents the corresponding VNIC from the point of view of the physical switches.

The operator defines policies with regard to the VIOCs. Generally, a policy defined for a given VIOC specifies an operation to be performed on the data packets that are associated with that VIOC. VIOC policies may comprise, for example, firewall rules, Virtual Local Area Network (VLAN) tagging policies, encryption policies, authentication policies, Quality-of-Service (QoS) policies, monitoring policies, mirroring policies, activation/deactivation policies and many others. Several examples of VIOC policies are addressed further below.

When the virtual system is implemented and running on the physical system, the different VIOC policies are enforced by the physical switches. The configuration station automatically translates the VIOC policies defined by the operator into a configuration of the physical switches, and configures the physical switches accordingly. Once configured, the physical switches operate on the data packets generated by the VNICs of the virtual or physical compute nodes, so as to enforce the policy.

The automatic translation of VIOC policies into physical switch configuration is based on the above-mentioned fact that a given VNIC can be identified by the source attributes of the data packets it generates. In order to translate VIOC policies into physical switch configuration, the configuration station associates each VIOC with a unique set of source attribute values. This attribute set is sometimes referred to as the key of the VIOC. In other words, a data packet whose source attribute values match the key of a certain VIOC is treated as being communicated over this VIOC.

Using this definition of VIOC key, the configuration station translates a VIOC policy that specifies a certain operation into a physical switch configuration, which instructs the physical switches to perform the specified operation on any data packet whose source attributes match the predefined VIOC key. The switches identify data packets whose source attribute values match the key of a given VIOC, and perform the specified operation on these packets, so as to enforce the policy. In some embodiments that are described herein, the VIOC keys, policies and physical switch configurations are represented using means such as Access Control Lists (ACLs) or other switch policy tables.

Additional methods that are described herein provide automated means for retaining the VIOC policies when changes in the configuration of the physical or virtual systems occur. In some embodiments, the configuration station detects such configuration changes, and modifies the configuration of the physical switches accordingly.

In some embodiments, two or more VIOCs can be grouped to form a VIOC cluster. A cluster can be managed as a single entity, thus simplifying the management of VIOCs. For example, the operator may define policies for a given cluster and/or assign resources to a cluster. The configuration station typically translates the cluster policies into VIOC-specific policies, and distributes the VIOC policies to the appropriate physical switches.

When using the disclosed methods and systems, various kinds of VIOC policies can be defined and enforced automatically. From the user's perspective, VIOCs are treated much like physical switch ports. The user is usually concerned only with VIOC-level definitions, and is unaware of the underlying physical infrastructure on which the virtual system is implemented.

System Description

FIG. 1 is a block diagram that schematically illustrates a physical computer system 20, in accordance with an embodiment of the present invention. As will be described below, physical system 20 forms a physical infrastructure over which a virtual computer system is defined and operated. Physical system 20 comprises physical compute nodes, such as servers 24, and physical packet switching elements, such as switches 28. The compute nodes and switching elements are interconnected by a network 32. Each physical compute node communicates over network 32 using one or more Network Interface Cards (NICs) 36.

The physical system may also comprise other kinds of physical elements that are not shown in the figure, such as physical storage devices. Although the example of FIG. 1 refers to physical servers and switches, the methods and systems described herein may be used with other sorts of physical compute nodes (such as personal computers, workstations or any other suitable computing platforms) and with other sorts of physical packet switching elements, such as routers.

In some embodiments, system 20 may comprise a grid computing system. Some aspects of using grid systems for virtualization applications are described, for example, in U.S. Patent Application Publication 2008/0123559, whose disclosure is incorporated herein by reference.

System 20 is used as the physical infrastructure for implementing and executing a virtual computer system, as will be described further below. The virtual system is defined, configured and operated using a configuration station 40. Station 40 comprises a network interface 44 for communicating over network 32 with the different elements of physical system 20, and a processor 48 that carries out the configuration methods described herein. Typically, processor 48 interacts with an operator of station 40 using suitable input devices (e.g., keyboard or mouse) and output devices (e.g., a display). Typically, processor 48 comprises a general-purpose computer, which is programmed in software to carry out the functions described herein. The software may be downloaded to the computer in electronic form, over a network, for example, or it may, alternatively or additionally, be provided and/or stored on tangible media, such as magnetic, optical, or electronic memory.

FIG. 2 is a block diagram that schematically illustrates a virtual computer system 50, in accordance with an embodiment of the present invention. In some embodiments, virtual system 50 comprises various software objects, such as virtual compute nodes (also referred to as Virtual Machines—VMs), Virtual Network Interface Cards (VNICs), virtual storage devices and virtual networks, which emulate the operation of real-life elements. The different virtual objects are defined, configured and executed on the physical elements (e.g., physical servers and physical switches) of physical system 20. The virtual system as a whole is typically defined and configured to perform a certain data processing application, such as a data center application.

Note that in some embodiments the virtual system may comprise physical elements, as well. For example, a virtual computing system may comprise a physical computer having a physical NIC, over which multiple Virtual NICs (VNICs) are defined and multiplexed. Thus, in the description that follows, the term "compute node" refers to physical compute nodes as well as to virtual compute nodes.

In the example of FIG. 2, virtual system 50 comprises three virtual/physical compute nodes 54, which communicate with one another over virtual networks 58. In accordance with the definition of the virtual system, each compute node 54 comprises one or more VNICs 60, which perform interface functions between the compute node and the virtual network. In some embodiments, each VNIC emulates the operation of an Ethernet™ NIC or of an Infiniband Host Channel Adapter (HCA). Compute nodes 54 of virtual system 50 communicate by exchanging data packets with one another.

In some embodiments, each VNIC 60 is uniquely associated with a corresponding Virtual Input/Output Connection (VIOC) 62. Once defined, the VIOCs are managed and operated by physical switches 28 in a similar manner to physical switch ports. In particular, various policies can be defined and enforced in the switches with respect to the VIOCs, as will be described below.

Virtual system 50 can be implemented on physical system 20 in various ways. For example, a given VM may be implemented using the resources of one or more physical servers. Additionally or alternatively, a given physical server may allocate resources to any desired number of VMs. The example physical and virtual systems shown in FIGS. 1 and 2 are chosen purely for the sake of conceptual clarity. In alternative embodiments, any other suitable physical computer system and any other suitable virtual computer system can be used.

VIOC Configuration and Operation

When virtual system 50 is implemented and executed by physical system 20, the virtual and physical systems are configured and controlled by the operator using station 40. In particular, the operator configures and controls the operation of VIOCs 62.

For example, it is often desirable to define and enforce a certain policy with respect to a given VIOC. Generally, a policy that is defined with regard to a given VIOC specifies an operation that is to be performed on the data packets associated with that VIOC.

Policies that are applicable to VIOCs may comprise, for example, firewall rules that define selective access privileges for different VIOCs, Virtual Local Area Network (VLAN) tagging policies, Virtual Private Network (VPN) policies or other encryption-related policies that define an encrypted channel per VIOC or pair of VIOCs, authentication policies, and/or Quality-of-Service (QoS) policies that manage the traffic bandwidth selectively per VIOC (e.g., by defining traffic shaping rules in terms of limited or guaranteed bandwidth). Other examples of VIOC policies comprise monitoring policies that specify single-point monitoring per VIOC or end-to-end monitoring per pair of VIOCs, mirroring policies that define data mirroring operations per VIOC, snooping policies for intercepting data packets having specified characteristics (e.g., packets exchanged between a certain pair of endpoints), enabling/disabling policies that control activation and deactivation of VIOCs, configuration policies that assign attributes or otherwise configure VIOCs, and/or any other suitable policy.

Using VIOC policies, the operator may allocate, for example, a certain Globally-Unique Identifier (GUID) value to one VIOC, and another GUID value to another VIOC. As another example, the operator may select a pair of VIOCs and assign a guaranteed bandwidth of 15 Mbps and a bandwidth limit of 18 Mbps to these VIOCs. The operator may select a VIOC or a pair of VIOCs and assign it a certain VLAN value. Additionally or alternatively, the operator may request monitoring of the transmitted packets and the link-down errors on a specified VIOC, or request monitoring of both transmitted and received packets between a specified pair of VIOCs.

Embodiments of the present invention that are described herein provide methods and systems for defining and operating VIOCs in virtualized computer systems. As will be explained in detail below, processor 48 in station 40 associates each VIOC with a respective key, which comprises a set of packet attribute values. In other words, a data packet whose attribute values match the predefined key of a given VIOC is interpreted as being communicated over this VIOC.

Using this definition of VIOC key, processor 48 translates the VIOC policies defined by the operator into an actual configuration of physical switches 28, and configures the physical switches accordingly. Once configured, the physical switches enforce the VIOC policies by operating on the data packets exchanged over physical network 32. Note that using the disclosed techniques, the physical switches are able to enforce the VIOC policies based on the inherent packet attributes, without a need to add any sort of dedicated tag or other information to the packets for the sake of policy enforcement.

As noted above, compute nodes 54 of virtual system 50 communicate by exchanging data packets with one another over VNICs 60. Each data packet has a number of attributes, such as source and destination Media Access Control (MAC) addresses, source and destination Internet Protocol (IP) addresses, source and destination Virtual Local Area Network tags (VLANs), and/or any other suitable attribute. Some of the packet attributes are indicative of the VNIC that generated the packet, and are thus referred to as source attributes. Source attributes may comprise, for example, source MAC address, source IP address or source VLAN.

MAC addresses can be assigned in different ways. For example, in a virtual compute node, a MAC address can be assigned by a user configuring the virtual compute node or automatically by the management system. In a physical compute node, the MAC address may be hard-programmed in the NIC, and can also be enforced by the operating system.

In some embodiments, processor 48 defines the key of each VIOC as a particular combination of source attribute values. In a typical embodiment, each VIOC corresponds to a particular combination of [source MAC address, source VLAN] values. In alternative embodiments, however, other suitable combinations can also be used. These combinations may comprise attributes such as priority level and/or source IP address in addition to the source MAC address and VLAN, thus further refining the VIOC definition.

FIG. 3 is a flow chart that schematically illustrates a method for specifying and operating virtual computer system 50, in accordance with an embodiment of the present invention. The method begins with the operator defining one or more physical and/or virtual compute nodes 54 of the virtual computer system, at a machine definition step 70. Each virtual or physical compute node 54 has one or more VNICs 60, as explained above. For each compute node, the operator defines one or more VIOCs 62, at a VIOC definition step 74. Each VIOC 62 (on the switch side) corresponds to a respective VNIC 60 (on the server side). In particular, each VIOC is uniquely identified with a particular set of packet source attribute values, as explained above. In addition, the operator defines one or more VIOC policies, at a policy definition step 78. Each VIOC policy specifies an operation to be performed by the physical switches with respect to data packets that are associated with the VIOC in question.

The operator carries out steps 70-78 by interacting with processor 48 of configuration station 40. Typically, processor 48 runs a suitable user interface, such as a Command Line Interface (CLI) or Graphical User Interface (GUI), which enables the operator to specify the virtual and/or physical machines, the VIOCs and the policies using suitable input and output devices.

Processor 48 translates the VIOC policies into a configuration of physical switches 28, at a translation step 82. The processor configures switches 28 according to this configuration, at a switch configuring step 86. For a given VIOC policy that specifies a certain operation, processor 48 configures the switches to perform the specified operation on any data packet whose source attribute values match the predefined key of the VIOC.

In some embodiments, the operator specifies the VIOC keys and policies by defining an Access Control List (ACL) specifying the source attributes corresponding to each VIOC and the corresponding policies. This ACL is referred to herein as a virtual ACL. Processor 48 translates the VIOC policies to physical switch configurations by converting the virtual ACL into an actual ACL. The actual ACL is used for configuring physical switches 28.

Figure 4:
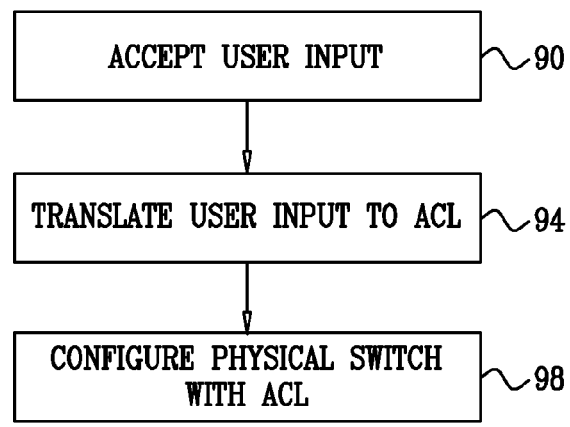
FIG. 4 is a flow chart that schematically illustrates a method for translating Virtual Input-Output Connection (VIOC) policies into physical switch configuration, in accordance with an embodiment of the present invention.

FIG. 4 is a flow chart that schematically illustrates a method for translating VIOC policies into physical switch configuration, in accordance with an embodiment of the present invention. The method begins with processor 48 accepting a command from the operator for setting a certain policy for a given VIOC, at an input step 90. The operator definition may be provided using any suitable means, such as a suitable Command Line Interface (CLI) or Graphical User Interface (GUI).

For example, a VIOC denoted v123 can be created and associated with source attributes [MAC=xxxx, VLAN=33] by entering the command "Set VIOC v123 MAC=xxxxx VLAN=33." From that point onwards, the VIOC can be managed using conventional port management commands. For example, the VIOC can be disabled by issuing the command "Set port v123 disable." As another example, the command "Set port v123 maxspeed=100M" sets the maximum speed of the VIOC. A "Show port v123 stats" command applies a policy that monitors the statistics of the VIOC. Further alternatively, any other suitable policy can be applied to the VIOC using similar commands. Processor 48 converts the operator command into an actual ACL, at an ACL conversion step 94. The processor then configures the physical switches using the actual ACL, at a configuration step 98.

The methods and systems described herein are in no way limited to the use of ACLs. In alternative embodiments, the processor can translate the operator command into any other suitable format that is recognizable by physical switches 28, such as various kinds of switch policy tables or policers, and configure switches 28 accordingly. For example, the processor may translate an operator command such as "VIOC w/ MAC XYZ, Drop packets" to one or more numerical commands to switch 28, instructing the switch to identify and drop packets having a certain pattern at a certain header location.

In some embodiments, the operator can aggregate multiple physical ports (e.g., multiple NICs) 36 to serve a single VIOC 62. This operation is referred to as trunking. Trunking may be useful, for example, for creating a high-bandwidth VIOC whose bandwidth exceeds the bandwidth of a single physical NIC, or to provide high availability (i.e., to ensure that the policy is maintained even when a given physical NIC fails). Moreover, since a certain VM can be implemented over two or more physical compute nodes, a certain VIOC may share the resources of multiple physical NICs that reside in different physical compute nodes. The operator can define keys and policies for trunked VIOCs in a similar manner to single-NIC VIOCs. Processor 48 translates and enforces such policies similarly, using the methods described above.

Maintaining VIOC Policies in the Event of Virtual/Physical System Configuration Changes The configuration of virtual system 50 and/or physical system 20 may change over time, and these configuration changes may affect the way in which VIOC policies are mapped to physical switch configurations. For example, a given VM (or parts thereof) may be moved from one physical compute node to another, a MAC address in one of the VMs may be changed, and/or the configuration of a certain physical compute node may change.

In some embodiments, processor 48 retains the desired VIOC policies even when the virtual and/or physical system configuration changes. Typically, the processor modifies the configuration of the physical switches based on the detected (virtual or physical) system configuration change, so that the VIOC operation remains unchanged from the user's perspective. In other words, the underlying translation of VIOC policies into physical system configuration is transparent to the user of the virtual system, who is usually aware only of the VIOC-level definitions.

In some embodiments, processor 48 detects such system configuration changes automatically, and modifies the physical switch configuration accordingly. For example, when a given VM comprising a given VIOC is moved from one physical compute node to another, processor 48 may need to configure a different physical switch to enforce the policies of the given VIOC. These operations are sometimes referred to as migration.

Processor 48 may detect a system configuration change, for example, by detecting exceptions or other notifications that are generated in the physical system. For example, if a certain VM source MAC address is changed, data packets carrying the new MAC address may cause an exception to be generated. The physical switches typically learn the new MAC address and trigger an exception. When the MAC address in question appears in a given VIOC key, processor 48 may detect this exception and modify the VIOC key to reflect the new MAC address.

Additionally or alternatively, the migration process may be assisted by the operator. For example, in some embodiments the operator reports system configuration changes manually to processor 48, and the processor modifies the translation of VIOC policies to physical switch configuration in response to the reported change.

Figure 5:
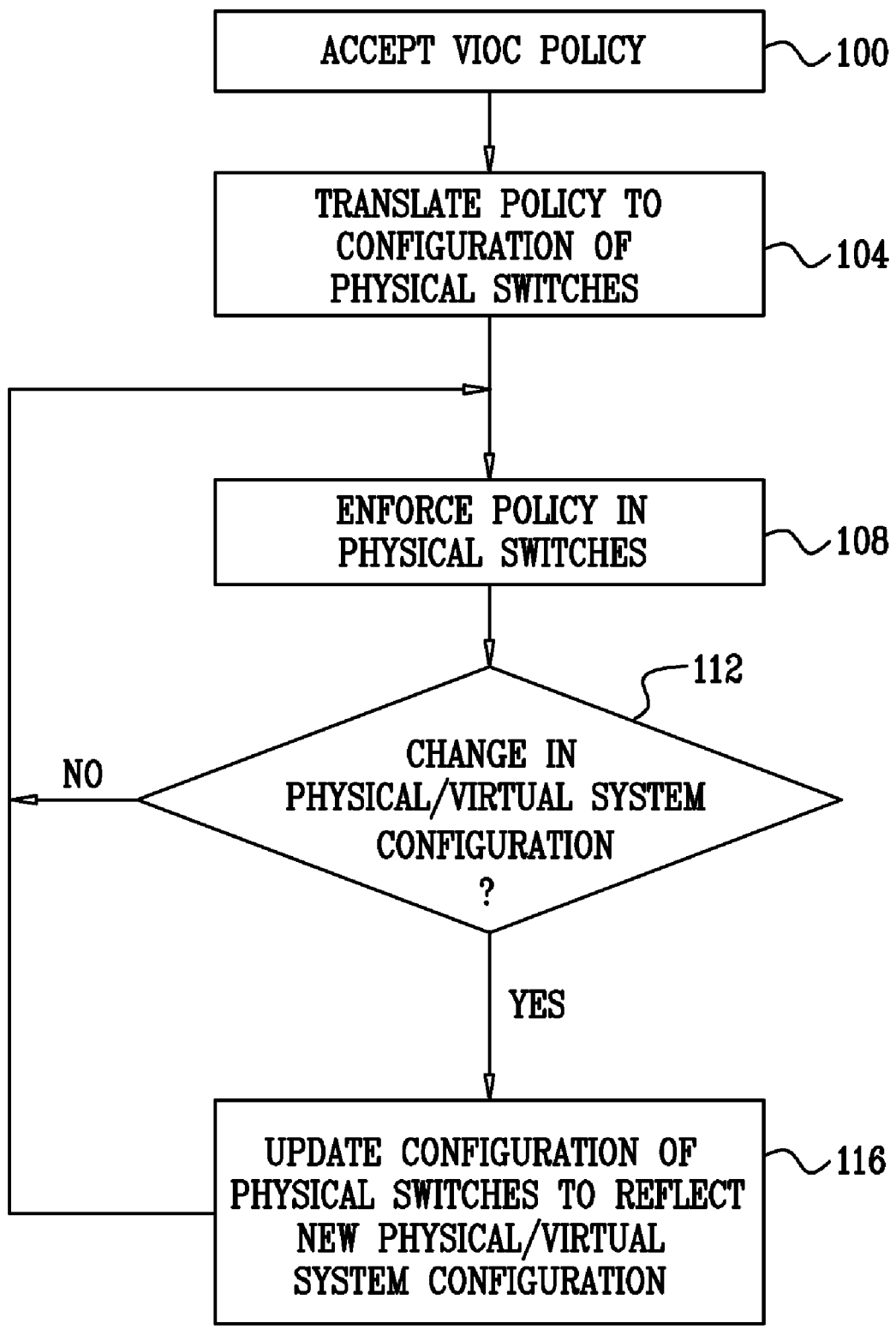
FIG. 5 is a flow chart that schematically illustrates a method for updating physical switch configuration in the event of virtual or physical system configuration changes, in accordance with an embodiment of the present invention.

FIG. 5 is a flow chart that schematically illustrates a method for updating the physical switch configuration in the event of configuration changes in physical system 20 or in virtual system 50, in accordance with an embodiment of the present invention. The method begins with processor 48 accepting a given VIOC policy, at a policy input step 100. The processor translates the VIOC policy to a configuration of one or more physical switches, as explained above, at a conversion step 104. The physical switch or switches enforce the VIOC policy using the configurations set by processor 48, at an enforcing step 108.

Processor 48 checks whether a change occurred in the configuration of physical system 20 and/or virtual system 50, at a change detection step 112. The change detection process may be automatic or manual. In other words, processor 48 may detect the change automatically by monitoring the operation of the physical and virtual systems, or it may accept a notification from the operator indicating the change. As long as no change occurs, the method loops back to step 108 above, in which the physical switches continue to enforce the VIOC policy.

When processor 48 determines that a change occurred in the configuration of physical system 20 or virtual system 50, the processor updates the configuration of the physical switch or switches to reflect the change, at a switch updating step 116. The updated physical switch configuration causes the physical switch or switches to continue enforcing the VIOC policy accepted at step 100 above, given the detected (physical or virtual) system configuration change. The method then loops back to step 108 above.

Using the method of FIG. 5, VIOC policies can be enforced seamlessly by the physical switches during and following configuration changes in the physical and/or virtual system. In some embodiments, the operator may be unaware of the modifications applied to the physical switch configurations, since the policies at the VIOC level continue to be enforced without interruption.

Although the embodiments described herein mainly address virtual compute nodes having virtual I/O connections, the principles of the present invention can also be used for configuring and operating other virtual objects having virtual I/O connections, such as virtual storage devices in Storage Area Network (SAN) configurations.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computing method, comprising:
   specifying a virtual computer system comprising at least one virtual or physical compute node, which produces data packets having respective source attributes;
   defining at least one Virtual Input-Output Connection (VIOC) that is uniquely associated with the values of the source attributes;
   defining a policy specifying an operation to be performed with regard to the VIOC;
   implementing the virtual computer system on a physical computer system that includes at least one physical packet switching element; and
   configuring the physical packet switching element to identify the data packets whose source attributes have the values that are associated with the VIOC and to perform the operation on the identified data packets, so as to enforce the policy on the VIOC,
   wherein configuring the physical packet switching element comprises detecting a change in one of the physical computer system and the virtual computer system, and re-configuring the physical packet switching element responsively to the detected change, so as to cause the physical packet switching element to continue enforcing the policy,
   wherein the at least one physical packet switching element comprises first and second physical packet switching elements, wherein configuring the physical packet switching element comprises initially configuring the first physical packet switching element to enforce the policy, and wherein re-configuring the physical packet switching element comprises, responsively to detecting the change, configuring the second physical packet switching element to enforce the policy.

2. The method according to claim 1, wherein specifying the virtual computing system comprises specifying a Virtual Network Interface Card (VNIC) for the compute node, and wherein defining the VIOC comprises associating the VIOC with the VNIC.

3. The method according to claim 1, wherein the source attributes comprise at least one attribute type selected from a group of types consisting of a source Media Access Control (MAC) address, a source Virtual Local Area Network (VLAN), a priority level and a source Internet Protocol (IP) address.

4. The method according to claim 1, wherein configuring the physical packet switching element comprises producing a definition, having a format that is recognizable by the physical packet switching element, of the values of the source attributes that are associated with the VIOC, and configuring the physical packet switching element using the definition.

5. The method according to claim 4, wherein the definition comprises an Access Control List (ACL).

6. The method according to claim 1, wherein the physical computer system comprises at least one physical computer comprising multiple physical ports, and wherein defining the VIOC comprises aggregating the multiple physical ports and associating the VIOC with the multiple aggregated physical ports.

7. The method according to claim 1, wherein the policy specifies access privileges with regard to the data packets that are associated with the VIOC.

8. The method according to claim 1, wherein the policy defines a Virtual Local Area Network (VLAN) for exchanging the data packets that are associated with the VIOC.

9. The method according to claim 1, wherein the policy defines an encryption operation to be applied with regard to the VIOC.

10. The method according to claim 1, wherein the policy defines an authentication operation to be applied with regard to the VIOC.

11. The method according to claim 1, wherein the policy defines a Quality-of-Service (QoS) property of the VIOC.

12. The method according to claim 1, wherein the policy requests monitoring of information related to the VIOC.

13. The method according to claim 1, wherein the policy defines a mirroring operation to be performed with regard to the VIOC.

14. The method according to claim 1, wherein the policy requests one of an activation and a deactivation of the VIOC.

15. The method according to claim 1, wherein defining the at least one VIOC comprises defining multiple VIOCs and grouping the multiple VIOCs to form a VIOC cluster, wherein defining the policy comprises defining a cluster policy to be applied to the multiple VIOCs in the VIOC cluster, and wherein configuring the physical packet switching element comprises configuring the physical packet switching element to apply the cluster policy to the data packets that are associated with any of the VIOCs in the VIOC cluster.

16. A computing apparatus, comprising:
an interface, which is operative to communicate with a physical computer system that includes at least one physical packet switching element; and
a processor, which is coupled to accept a specification of a virtual computer system comprising at least one virtual or physical compute node, which produces data packets having respective source attributes, to accept a definition of at least one Virtual Input-Output Connection (VIOC) that is uniquely associated with the values of the source attributes, to accept a policy specifying an operation to be performed with regard to the VIOC, to implement the virtual computer system on the physical computer system, and to configure the physical packet switching element to identify the data packets whose source attributes have the values that are associated with the VIOC and to perform the operation on the identified data packets, so as to enforce the policy on the VIOC,
wherein the processor is coupled to detect a change in one of the physical computer system and the virtual computer system, and to re-configure the physical packet switching element responsively to the detected change so as to cause the physical packet switching element to continue enforcing the policy,
wherein the at least one physical packet switching element comprises first and second physical packet switching elements, and wherein the processor is coupled to initially configure the first physical packet switching element to enforce the policy, and, responsively to detecting the change, to configure the second physical packet switching element to enforce the policy.

17. The apparatus according to claim 16, wherein the specification of the virtual computing system specifies a Virtual Network Interface Card (VNIC) for the compute node, and wherein the processor is coupled to associate the VIOC with the VNIC.

18. The apparatus according to claim 16, wherein the source attributes comprise at least one attribute type selected from a group of types consisting of a source Media Access Control (MAC) address, a source Virtual Local Area Network (VLAN), a priority level and a source Internet Protocol (IP) address.

19. The apparatus according to claim 16, wherein the processor is coupled to produce a definition, having a format that is recognizable by the physical packet switching element, of the values of the source attributes that are associated with the VIOC, and to configure the physical packet switching element using the definition.

20. The apparatus according to claim 19, wherein the definition comprises an Access Control List (ACL).

21. The apparatus according to claim 16, wherein the physical computer system comprises at least one physical compute node comprising multiple physical ports, and wherein the definition of the VIOC aggregates the multiple physical ports and associates the VIOC with the multiple aggregated physical ports.

22. The apparatus according to claim 16, wherein the policy specifies access privileges with regard to the data packets that are associated with the VIOC.

23. The apparatus according to claim 16, wherein the policy defines a Virtual Local Area Network (ULAN) for exchanging the data packets that are associated with the VIOC.

24. The apparatus according to claim 16, wherein the policy defines an encryption operation to be applied with regard to the VIOC.

25. The apparatus according to claim 16, wherein the policy defines an authentication operation to be applied with regard to the VIOC.

26. The apparatus according to claim 16, wherein the policy defines a Quality-of-Service (QoS) property of the VIOC.

27. The apparatus according to claim 16, wherein the policy requests monitoring of information related to the VIOC.

28. The apparatus according to claim 16, wherein the policy defines a mirroring operation to be performed with regard to the VIOC.

29. The apparatus according to claim 16, wherein the policy requests one of an activation and a deactivation of the VIOC.

30. The apparatus according to claim 16, wherein the definition of the at least one VIOC defines multiple VIOCs and groups the multiple VIOCs to form a VIOC cluster, wherein the policy comprises a cluster policy to be applied to the multiple VIOCs in the VIOC cluster, and wherein the processor is coupled to configure the physical packet switching element to apply the cluster policy to the data packets that are associated with any of the VIOCs in the VIOC cluster.

31. A non-transitory computer-readable medium in which program instructions are stored, which instructions, when read by a processor, cause the processor to communicate with a physical computer system that includes at least one physical packet switching element, to accept a specification of a virtual computer system comprising at least one virtual or physical compute node, which produces data packets having respective source attributes, to accept a definition of at least one Virtual Input-Output Connection (VIOC) that is uniquely associated with the values of the source attributes, to accept a policy specifying an operation to be performed with regard to the VIOC, to implement the virtual computer system on the physical computer system, and to configure the physical packet switching element to identify the data packets whose source attributes have the values that are associated with the VIOC and to perform the operation on the identified data packets, so as to enforce the policy on the VIOC, to detect a change in one of the physical computer system and the virtual computer system, and to re-configure the physical packet switching element responsively to the detected change so as to cause the physical packet switching element to continue enforcing the policy, wherein the at least one physical packet switching element comprises first and second physical packet switching elements, and wherein the instructions cause the processor to initially configure the first physical packet switching element to enforce the policy, and, responsively to detecting the change, to configure the second physical packet switching element to enforce the policy.

* * * * *